United States Patent
Recoura (10) Patent No.: US 10,226,993 B2
(45) Date of Patent: Mar. 12, 2019

(54) HYDRAULIC TORQUE MOTOR

(71) Applicant: POCLAIN HYDRAULICS INDUSTRIE, Verberie (FR)

(72) Inventor: Clement Philippe Recoura, Verberie (FR)

(73) Assignee: POCLAIN HYDRAULICS INDUSTRIE, Verberie (FR)

( * ) Notice: Subject to any disclaimer, the term of this patent is extended or adjusted under 35 U.S.C. 154(b) by 0 days.

(21) Appl. No.: 15/539,114

(22) PCT Filed: Dec. 23, 2015

(86) PCT No.: PCT/EP2015/081205
§ 371 (c)(1),
(2) Date: Jun. 22, 2017

(87) PCT Pub. No.: WO2016/102692
PCT Pub. Date: Jun. 30, 2016

(65) Prior Publication Data
US 2017/0349043 A1    Dec. 7, 2017

(30) Foreign Application Priority Data

Dec. 23, 2014 (FR) .................................. 14 63234

(51) Int. Cl.
*B60K 7/00* (2006.01)

(52) U.S. Cl.
CPC .... *B60K 7/0015* (2013.01); *B60K 2007/0038* (2013.01); *B60K 2007/0092* (2013.01)

(58) Field of Classification Search
CPC .......... B60K 7/0015; B60K 2007/0038; B60K 2007/0092
See application file for complete search history.

(56) References Cited

U.S. PATENT DOCUMENTS 4,171,732 A * 10/1979 Pinson ................. B60K 7/0015
                                                    180/308
4,508,010 A * 4/1985 Bock ....................... F03C 1/247
                                                    91/474

(Continued)

FOREIGN PATENT DOCUMENTS

DE    19503477    8/1996
GB    2112500    7/1983

OTHER PUBLICATIONS

Poclain Hydraulics Industrie, "Search Report and Written Opinion," FR Application No. 1463234, (dated Jul. 8, 2015) (with English Translation Cover Sheet).

(Continued)

*Primary Examiner* — Brian L Swenson
(74) *Attorney, Agent, or Firm* — Womble Bond Dickinson (US) LLP (57) ABSTRACT

An assembly (20) comprising a radial piston hydraulic motor (10), comprising a fixed housing (15), a shaft (14) that can be driven in rotation by the hydraulic motor (10), a wheel hub (30) comprising a hub barrel (31) that engages on the shaft (14), a bearing (40), a bearing support (41), in which the bearings (40) are housed between the hub barrel (31) and the bearing support (41) of the hydraulic motor (10), the bearing support (41) forming part of the housing (15), such that the bearing function is carried out by the housing (15), the shaft (14) supporting only the weight of same and having only a torque function.

20 Claims, 9 Drawing Sheets

(56) References Cited

U.S. PATENT DOCUMENTS

| | | | | |
|---|---|---|---|---|
| 4,649,772 A | * | 3/1987 | Daniel | B60K 17/046 180/10 |
| 5,333,705 A | * | 8/1994 | Lemaire | F03C 1/0447 188/170 |
| 5,472,062 A | * | 12/1995 | Nagai | B60G 3/00 180/252 |
| 5,820,506 A | | 10/1998 | Mann | |
| 6,102,824 A | * | 8/2000 | Kosodo | F16H 47/04 475/83 |
| 6,186,262 B1 | | 2/2001 | Mann et al. | |
| 6,260,653 B1 | * | 7/2001 | Forster | B60K 17/10 180/308 |
| 9,551,222 B2 | * | 1/2017 | Lucas | F01C 21/008 |
| 2014/0023543 A1 | * | 1/2014 | Attarde | F01C 21/008 418/61.3 |

OTHER PUBLICATIONS

Poclain Hydraulics Industrie, "International Search Report and Written Opinion," PCT Application No. PCT/EP2015/081205, (dated Mar. 9, 2016) (with English Translation Cover Sheet).

* cited by examiner

HYDRAULIC TORQUE MOTOR

GENERAL TECHNICAL FIELD

The invention relates to chassis, axle and hub architectures. In particular, the invention relates to bearing functions and the local motorization of wheels.

PRIOR ART

To compensate for a lack of vehicle torque and power, in particular in agricultural, construction site or materials handling machines, there exist intermittent torque increasing devices using radial piston motors, designated under the more generic name of temporary hydraulic assistance. When climbing for example, or with a heavy load or slippage, the hydraulic motors are activated and offer high-torque drive to the wheels motorized with said motors. These devices are in known fashion for example placed on the driven wheels and the non-driven wheels of the vehicle, so as to carry out a torque transfer from a powered axle to a non-powered axle, thus creating temporary wheel traction assistance. These motors can either be supplied by a high-pressure pump, or main pump, driven by a heat engine or, in a circuit without pumps, each axle comprising one or more motors, and transferring torque from one axle to the other, in one direction or the other, depending on need. This type of motor can therefore be placed either on an axle driven by a mechanical transmission, or on an axle not driven by said mechanical transmission, called a carrying axle. Low-pressure booster pumps can be added to fill or empty the circuit, control the circuit components or participate in cooling and in auxiliary functions depending on need.

Figure 1:
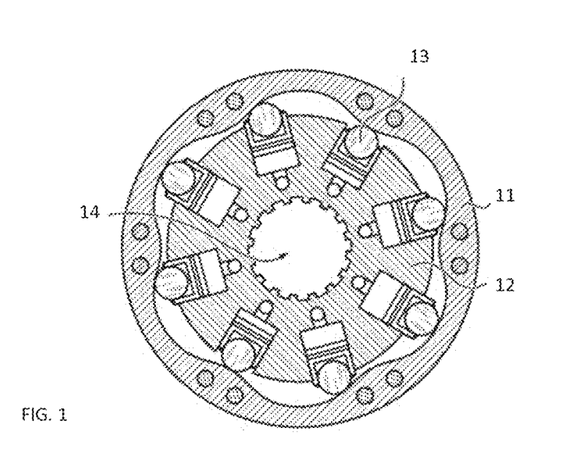
FIG. 1 shows a hydraulic motor with radial pistons.

With reference to FIG. 1, a hydraulic motor 10 with radial pistons comprises one lobed cam 11, a cylinder block 12, pistons 13, a shaft 14. The pistons 13, in contact with the lobed cam 11, carry out back-and-forth movements within their respective cylinder, which allows hydraulic energy to be converted into mechanical energy. Such motors have low rotation speed but high torque.

There exist several types of architecture allowing the transmission of torque from the motor 10 to the wheel. However, certain ones require complex and costly adaptations.

Figure 2A:
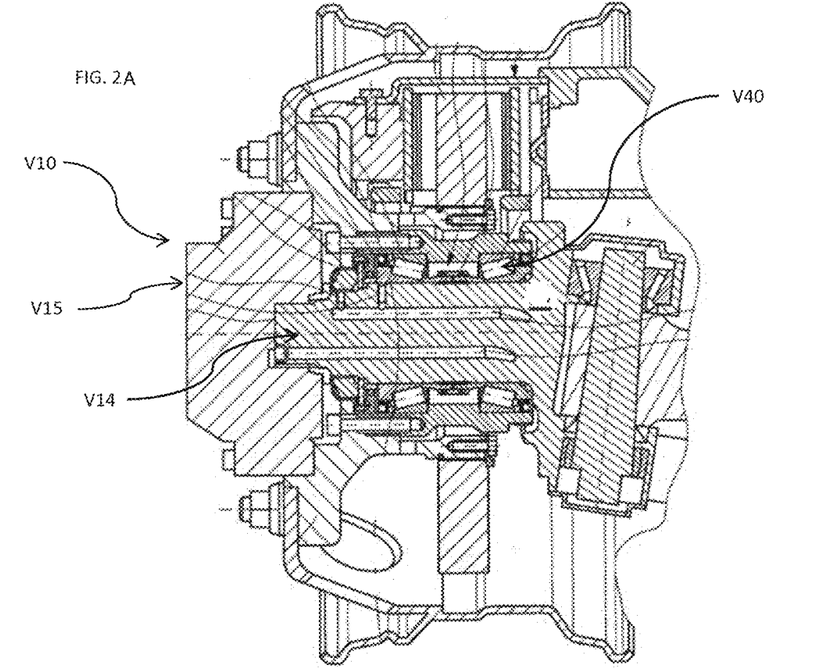
FIG. 2a shows a prior art assembly.

Document WO201140843 describes a hydraulic motor V10 with a fixed shaft V14 and a rotating housing V15, the housing driving the wheel hub and the bearings supported on the shaft. In this architecture, the fixed shaft V14 is coincident with the wheel spindle and the bearings V40 take up the vehicle load on the spindle. Moreover, the hydraulic motor is situated on the outside of the wheel. Such an architecture is shown in FIG. 2a.

It is also known to have a hydraulic motor 10 the shaft 14 whereof constitutes the axle of the wheel and carries the bearings, meaning that it supports the weight of the vehicle. Application FR 1358962 (in its prior art) and document FR2996277, both in the name of the Applicant, have bearings supported directly by the motor shaft.

Figure 2B:
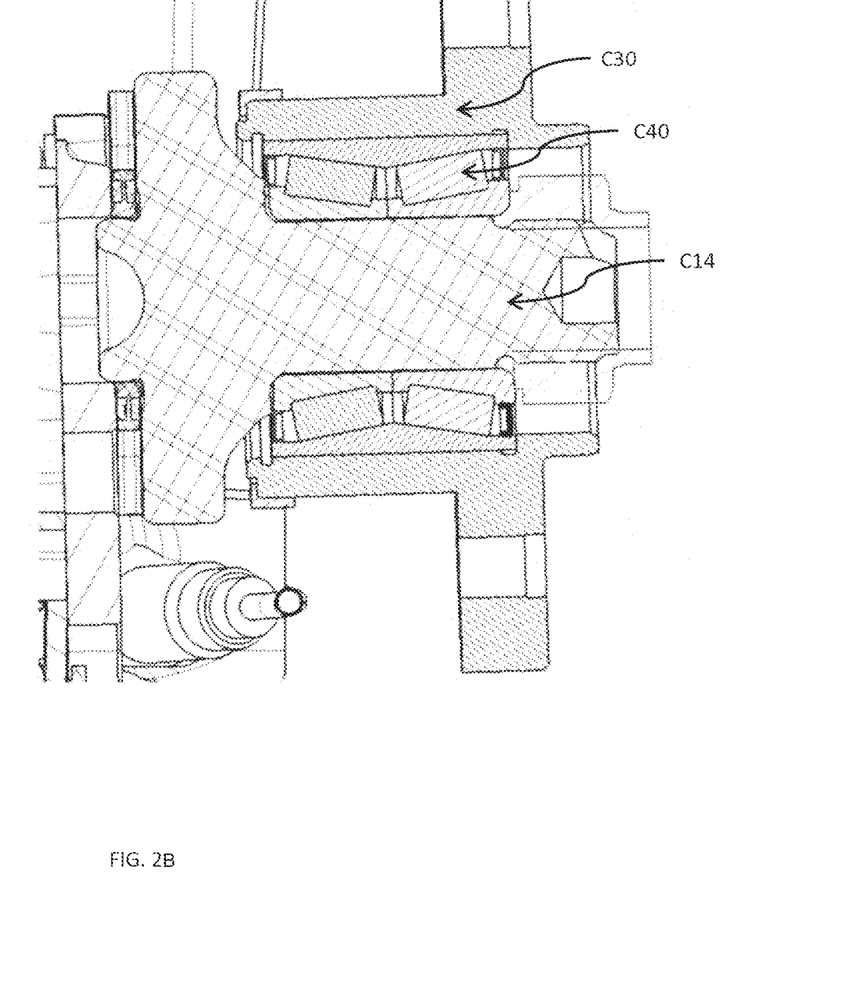
FIG. 2b shows a non-motorized wheel like those existing in the prior art.

Yet it is desirable to obtain a hydraulic motor capable of being mounted on classic vehicle architectures, such as a non-motorized hub shown in FIG. 2b (hub C30, bearing C40, shaft spindle C14), without needing complex arrangements. In particular, the installation of a torque motor, that is one the shaft whereof does not carry the weight of the vehicle, is desired.

PRESENTATION OF THE INVENTION

The invention relates to an assembly comprising:
A hydraulic motor with radial pistons, comprising a fixed housing,
A shaft, which can be driven in rotation by the hydraulic motor,
A wheel hub comprising a hub barrel which grips the shaft,
A bearing,
A bearing support,
Wherein:
the bearings are housed between the hub barrel and the bearing support of the hydraulic motor,
the bearing support is part of the housing,
in such a manner that the bearing function is carried out by the housing, the shaft supporting only its own weight and having only a torque function.

The assembly can comprise the following features, taken alone or in combination:
the hydraulic motor comprises a cylinder block which drives the shaft in rotation and wherein said cylinder block and shaft can be disengaged, the bearing function being retained by the housing in the disengaged and engaged position,
the assembly comprises a multi-disk coupler between the cylinder block and the shaft, the coupler allowing engagement and disengagement,
the bearing is situated longitudinally between the hub and the hydraulic motor,
the shaft is a through shaft on the side of the hydraulic motor,
the motor comprises a speed measurement function, comprising a target linked to a rotating portion, and a sensor linked to a fixed portion of the motor, giving an indication of the rotation speed of the wheel even if the motor is disengaged; the speed measurement function is used advantageously for ABS,
the target is housed in the emerging end of the shaft on the side of the hydraulic motor, the sensor being attached to a fixed portion; the target is advantageously an ABS target,
the assembly also comprises brakes,
the brake is a disk brake with one disk firmly mounted to the hub and a caliper firmly mounted to the housing and/or to a distribution cover and adapted to clamp the disk,
the brake is a drum brake, with a drum firmly attached to the hub and at least one shoe firmly attached to the housing,
a cardan shaft is connected to the through portion of the shaft, said cardan transmitting a torque to the shaft,
said cardan is connected to a mechanical transmission chain, the hydraulic motor applying a torque in the same direction or in the opposite direction to that exerted by said mechanical transmission.

The invention also relates to a system comprising an assembly according to any one of the foregoing claims and a suspension element, characterized in that the housing and/or a distribution cover, comprised in the housing, is firmly attached to the suspension element.

In addition, the system can have supply lines carried by the housing or the distribution cover firmly attached to the suspension element.

The suspension element can be a suspension arm.

The invention relates to a vehicle comprising an assembly or a system according to any one of the foregoing claims.

The invention also proposes motor assembly methods comprising a step consisting of firmly attaching the motor and the brakes with the suspension element by means of screws.

Advantageously, the method can comprise the following features, taken alone or in combination:
the system comprises brakes, and the firm attachment step comprises the following steps:
Installation and firm attachment of a fixed portion of the brakes to the suspension element by means of screws, the screws being inserted first into the suspension element, then subsequently into the fixed portion,
Installation and firm attachment of the motor to the suspension element by means of screws, each screw being inserted first into the housing, then subsequently into the suspension element,
in such a manner that the assembly is designed to be carried out from the interior of the vehicle, on the axle side.
the system comprises brakes, and the firm attachment step comprises the following steps:
Installation of the motor and of a fixed portion of the brakes on either side of the suspension element,
Firm attachment of the motor, of the suspension element and of the fixed portion of the brakes, by means of screws, each screw being inserted first into the fixed portion, then into the suspension element, and finally into the housing, in such a manner that the assembly can be carried out from the outside of the vehicle, on the wheel side.
the method comprises a step consisting of
Installation of the hub and of a movable portion of the brakes, configured to be firmly attached to the hub,
Installation of a spindle nut at the end of the shaft to hold the hub.

PRESENTATION OF THE FIGURES

Other characteristics, aims and advantages of the invention will be revealed by the description that follows, which is purely illustrative and not limiting, and which must be read with reference to the appended drawings, wherein.

DETAILED DESCRIPTION

A detailed embodiment of the assembly 20 will be described with reference to FIG. 3.

The assembly 20 comprises a hydraulic motor 10 with radial pistons as previously described. It is used to motorize the wheels of a vehicle mounted on a chassis.

The motor 10 can be connected hydraulically either to a high-pressure pump driven by a heat engine or electric motor, or supplied by another hydraulic motor connected to another wheel of a vehicle.

The motor comprises the lobed cam 11, the cylinder block 12, the pistons 13, and the shaft 14. The motor is housed in a housing 15, to which the lobed cam 11 is firmly attached. The housing 15 is under oil pressure.

The motor 10 comprises a distributor 15a which supplies the cylinder block with oil under pressure and the housing 15 comprises a distribution cover 15b. The distributor 15a is floating and slides longitudinally along the axis of the shaft 14, inside the cover 15b. Supply grooves 15c, 15d are provided between the distribution cover 15b and the distributor 15a. These grooves are connected to the hydraulic supply and return lines (not shown in the figures) of the motor.

According to one embodiment, the supply lines are carried by the housing 15 or the distribution cover 15b.

The distribution cover 15b can be an integral part of the housing 15, or at a minimum be firmly attached to the housing 15, but be independent.

The shaft 14 is driven in rotation by the cylinder block 12.

In on embodiment, the cylinder block 12 and the shaft 14 can be disengaged, with the shaft rotating: when engaged, the cylinder block 12 is linked in rotation with the shaft 14; when disengaged, the cylinder block is no longer linked in rotation with the shaft 14.

If the motor is of the type having pistons pushed by springs in contact with the cam, the cylinder block 12 becomes immobile with respect to the cam when it is disengaged. For this purpose, the shaft 14 has a radial extension 16 at the cylinder block and a multi-disk coupler 17 (see FIG. 3). The multi-disk coupler 16 is inserted between the radial extension 16 and the cylinder block 12.

Document WO 2014/048842 in the name of the Applicant describes multi-disk couplers: the cylinder block 12 comprises a plurality of disks adapted to cooperate with a plurality of other disks linked to the shaft 14. Under the influence of pressurization, the distributor 15a moves toward the cylinder block 12 and drives the engagement of the disks of the coupler 17. In the absence of a supply of pressure by the distributor 15a, a return means (not shown) such as Belleville washer for example, holds the cylinder block 12 pressed against the distributor 15a and disengages the disks of the coupler 17. The advantages of such a system are explained in said document.

In another embodiment, the cylinder block 12 and the lobed cam 11 can be disengaged. The motor is then of the type having retractable pistons 13, the cylinder block 12 is then firmly attached to the shaft 14 and they can rotate freely. The modes allowing disengagement thus make it possible to leave the wheel free when that is necessary or desirable.

The assembly 20 comprises a wheel hub 30 which is used to carry a wheel of the vehicle (not shown in the figures). More precisely, the hub 30 comprises a hub barrel 31 which constitutes the central portion of the hub 30 which grips the shaft 14, that is the hub 30 grips the shaft 14 directly. The shaft 14, with the hub 30, constitute the wheel spindle.

The assembly also comprises a bearing 40 to allow rotation of the wheel. The bearing 40 is housed in a cavity C formed between the hub barrel 31, radially internal, and a bearing support 41, radially external, comprised in the housing 15. The cavity C is closed by the hub barrel 31 and the bearing support 41, with seals 43a, 43b. The seal system will be described later. In one embodiment, the cavity is closed longitudinally by the hub barrel 31 of the wheel and by the radial extension 16 of the shaft 14, on the side of the cylinder block 12 (FIG. 3).

The bearing 40 is therefore housed between the hub barrel 31 of the hub 30 and the bearing support 41 of the housing 15. The bearing support 41 is a part of the housing 15. The transfer of force, that is the transmission of the weight of the vehicle, is accomplished from the hub 30 toward the bearing support 41, that is the housing 15, via the bearings 30.

The bearing function is provided by the housing 15; the shaft 14 does not carry any weight (other than its own) and is used only for torque transmission. This is an architecture called "torque motor."

Figure 3:
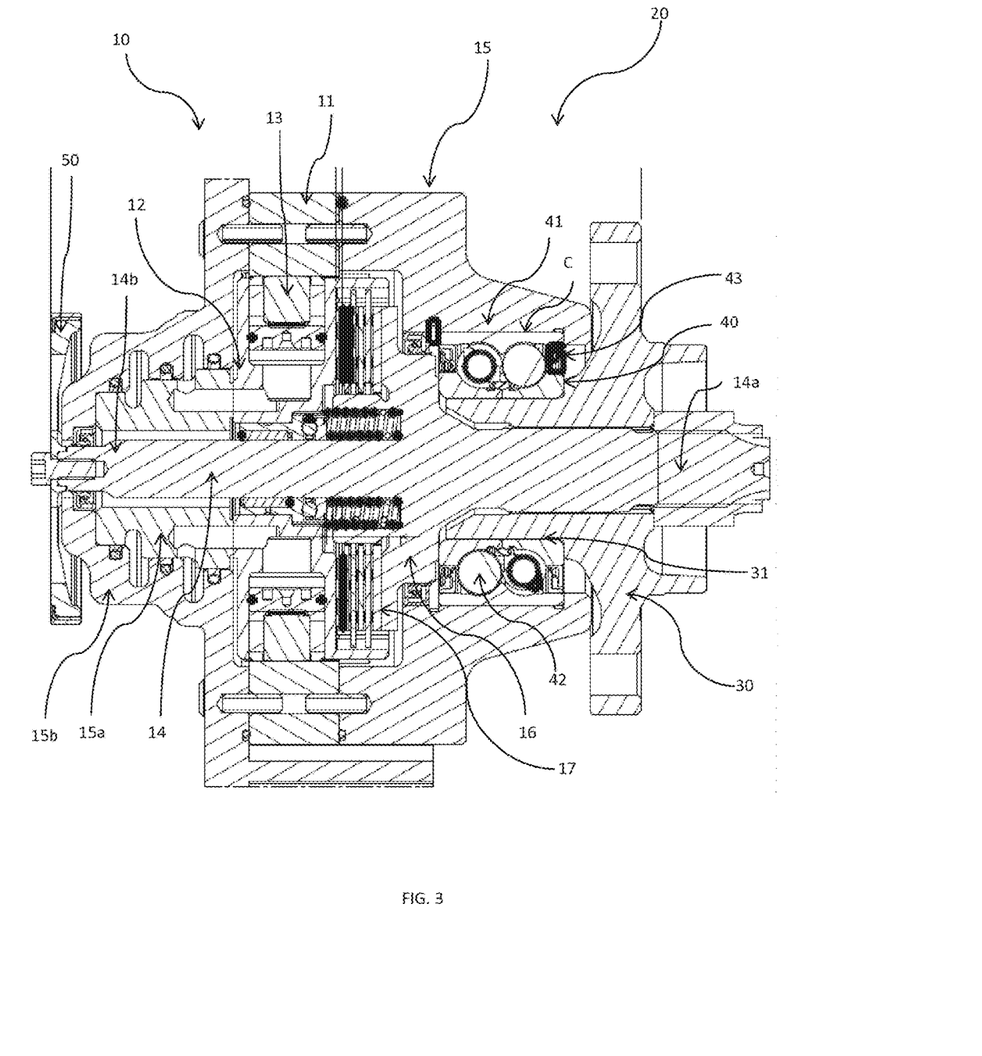
FIG. 3 shows an assembly conforming to an embodiment of the invention.
Figures 4, 5:
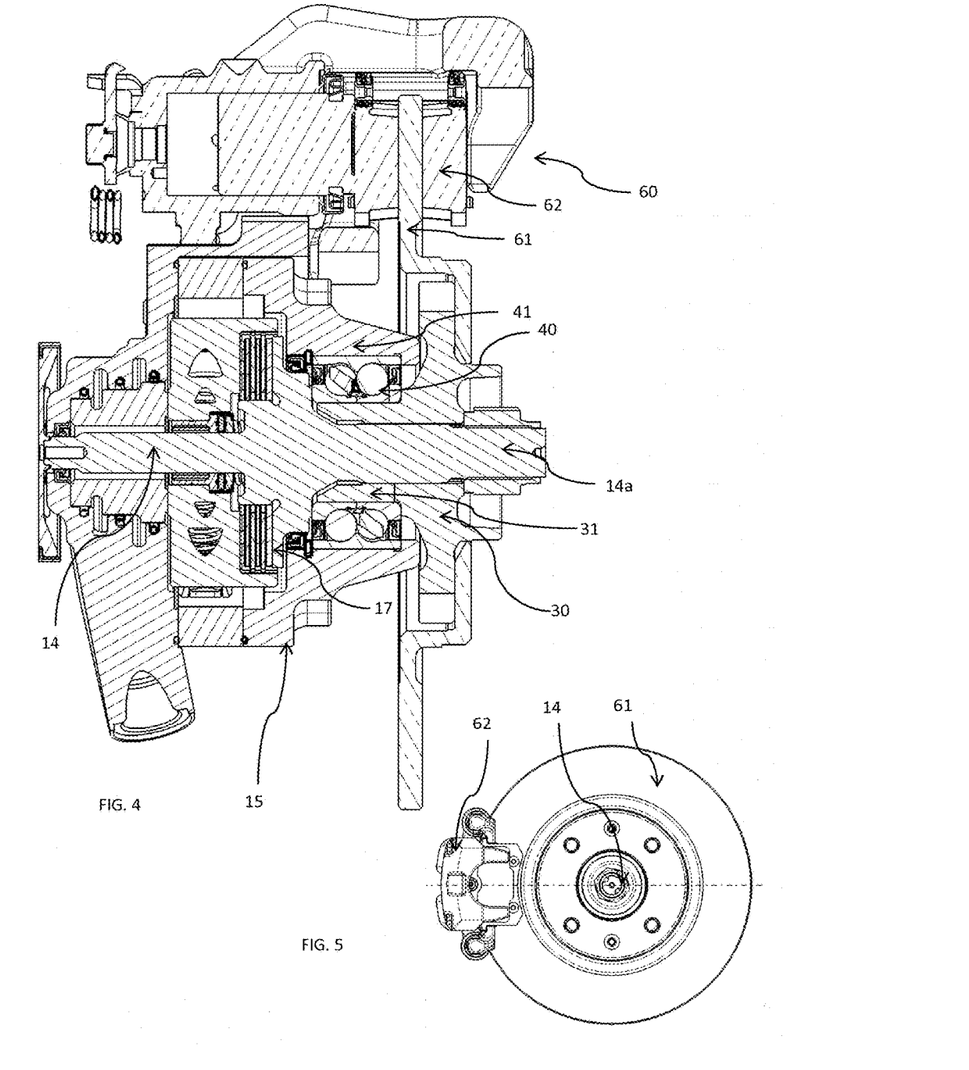
FIGS. 4 and 5 show an assembly conforming to an embodiment of the invention with a disk brake.

Thus there are, as shown in FIGS. 3, 4 and 5, moving radially away from the shaft 14: the shaft 14, the hub barrel 31, the bearing 40, the housing 15.

In known fashion, an elastic ring or another means provides for longitudinal blocking between the bearing support 41, the rolling elements 42 and the hub 30.

By this configuration, the wheel hub 30 is that already present on production vehicles and the assembly does not require any complex adaptations.

For this reason, the bearing 40 is located longitudinally between the hub 30 and the hydraulic motor 10.

Supply of the motor (supply lines, return lines, and the drains) is accomplished through the distribution cover 15b by means of a hydraulic circuit, comprising flexible and rigid pipes, linked to the chassis of the vehicle. The supply lines are screwed/hydraulically connected to a fixed part connected to the transmission arm, cover 15b or housing 15. Internal lines (not shown) connect these ports to the grooves of the distributor 15c, 15d via the distribution cover 15b.

The bearing 40 is formed from rolling elements 42, consisting of balls, of rollers or of needles, similarly to the rolling elements present on standard wheel hubs 30. The rolling elements 42 are immersed in lubricating grease. To protect these rolling elements 42, a first fluid-tight seal 43a is positioned at the cavity C, between the rolling elements 42 and the wheel, and a second fluid-tight seal 43b is positioned at the cavity C between the hydraulic motor 10 and the rolling elements 42. The cavity C is thus made fluid-tight. For example, seal rings or even cassette mounting bearing seals can be suitable for the first and second seals 43a, 43b.

More precisely, in the embodiment where the radial extension 16 closes the cavity C at the junction between the radial extension 16 of the shaft 14 and the housing 15, a rotating fluid-tight seal (seal ring or face seal or other) 43c is provided for preventing the escape of hydraulic oil from the housing 15. In addition, a volume V is housed at this point, between the seals 43b and 43c (see FIG. 3), it can be closed and filled with air, or filled with a gel, for instance an hydrophobic or anti-corrosion gel, or even be connected to the external environment by a bore, or connected to a drain line.

The shaft 14 passes through the assembly 20 from side to side. At the wheel, an external end 14a of the shaft 14 constitutes the wheel spindle to which the hub 30 is engaged. On the other side, an internal end 14b on the side of the hydraulic motor, passes through the distributor 15a and the distribution cover 15b, even the housing 15 depending on the variant architectures of these elements.

This arrangement has a plurality of advantages.

The first consists of being able to add a speed measurement function 50, for example for ABS ("Antiblockierensystem", Antilock Braking System). This function uses a target 51 which is linked to a rotating portion of the assembly, and a sensor 52 which is linked to a fixed portion (such as the housing 15 or the distributor cover 15b for example). The speed measurement function 50, for example for ABS, measures the rotation speed of the wheel and a computing unit (not shown) measures the deviations from the speed of the vehicle and can, in this manner, the adjust the speed of rotation of the wheels (by releasing the brakes for example). The target 51 is advantageously situated in the internal end 14b of the shaft 14 which leads from the internal end of the assembly, which makes it possible to easily integrate the speed measurement function. The speed measurement 50 is used in particular for ABS, but also for any other system requiring this datum.

In addition, by being attached to the internal end 14b of the shaft 14, the target 51 can transmit information relating to the speed of the wheel even when the hydraulic motor 10 is disengaged.

The second makes it possible to connect a certain cardan shaft to the shaft 14, through this internal end 14b, to transmit torque. This makes it possible to combine the hydraulic motor 10 with another motorization device, such as a heat engine or another hydraulic motor, with axial pistons for example, having a greater speed of rotation but a smaller torque.

In one embodiment, the cardan is connected to a mechanical transmission chain. The chain can comprise a gearbox driven by a heat engine. The hydraulic motor 10 then applies a torque in the same direction (torque increase) or in the opposite direction (restraint) as that exerted by said mechanical transmission.

Thanks to the disengaging, which can liberate the shaft 14, the assembly is adapted to operate in several regimes (low speed, high speed, high torque, low torque) and can equip both wheels which were previously free or already motorized.

As shown in FIGS. 6 through 10, the housing 15 and/or the distribution cover 15b are typically firmly connected to a suspension part 70. This suspension part 70 can be a suspension arm, a suspension arm flange, an attachment plate at the end of the suspension arm. The suspension part 70 makes it possible to connect the load chain between the chassis of the vehicle and the motor 10.

According to an alternative, the housing 15 and/or the cover 15b can themselves constitute the suspension arm.

A suspension arm can also be assembled to both parts at the same time.

For holding the housing 15 and/or the cover 15b, mounting brackets 15e are provided (see FIG. 7), preferably formed integrally. Assembly methods for the different elements will be described later.

The assembly can also integrate brakes 60.

In a first embodiment shown in FIG. 3, the brakes are implemented as disk brakes, with a disk 61 firmly mounted to the hub 30 and a caliper 62 firmly mounted to the housing 15 or to the distribution cover 15b.

Alternatively, the caliper 62 can be mounted on the cam 11, by providing it with attachment lugs, or even on the suspension arm.

Under hydraulic control, the caliper 62 clamps the disk 61 and converts the kinetic energy of rotation into heat, to slow down the vehicle (FIG. 4).

Figure 6:
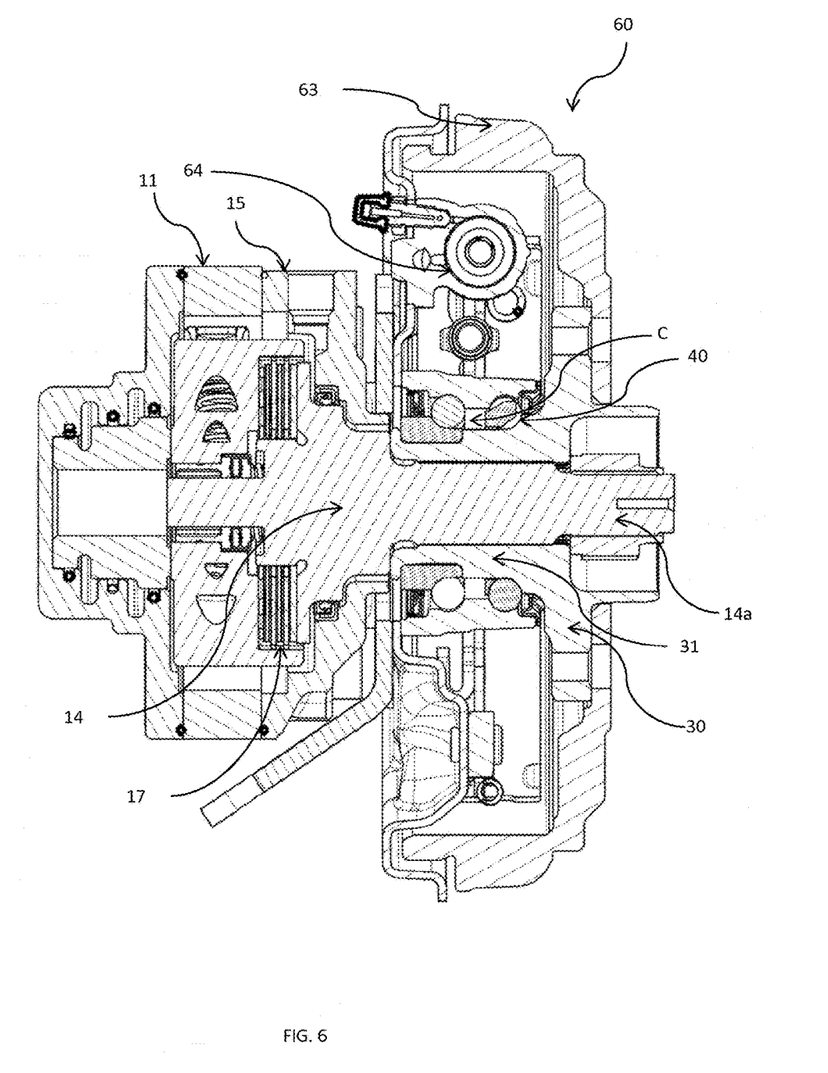
FIG. 6 shows an assembly conforming to an embodiment of the invention with a drum brake.

In the second embodiment shown in FIG. 6 the brakes are implemented as drum brakes, with a drum 63 firmly attached to the hub 30 and a shoe 64 firmly attached to the housing 15. On command, the shoe 64 presses itself against the drum 63. In this FIG. 6, the cavity C is formed only by the hub barrel 31 and the bearing support 41. Seals are also present for fluid-tightness. The drum 63 is mounted radially beyond the bearing 40.

The disk 61 and the caliper 62, or the drum 63 and the shoes 64, are arranged longitudinally between the wheel and the bearings 40, to simplify maintenance and disassembly.

The bitten portion of the disk 61 and the caliper 62, or the clamped portion of the drum and the shoes 64, are situated radially beyond the bearings 40.

A mobile portion 61, 63 of the brakes 60 is defined, which comprises brakes 60 which comprise in particular disk and drum, and a fixed portion 62, 64 of the brakes 60 is defined which comprises in particular the caliper and the shoes.

The motor 10 as described here has the advantage of being able to be mounted on standard axles, by assembly of a motor in closed form. This is referred to as a "cartridge" motor, which does not necessitate major adaptations on the vehicle which it must equip and which takes the form of a pre-assembled motor, requiring essentially to be assembled directly.

Assembly Method

Figure 9:
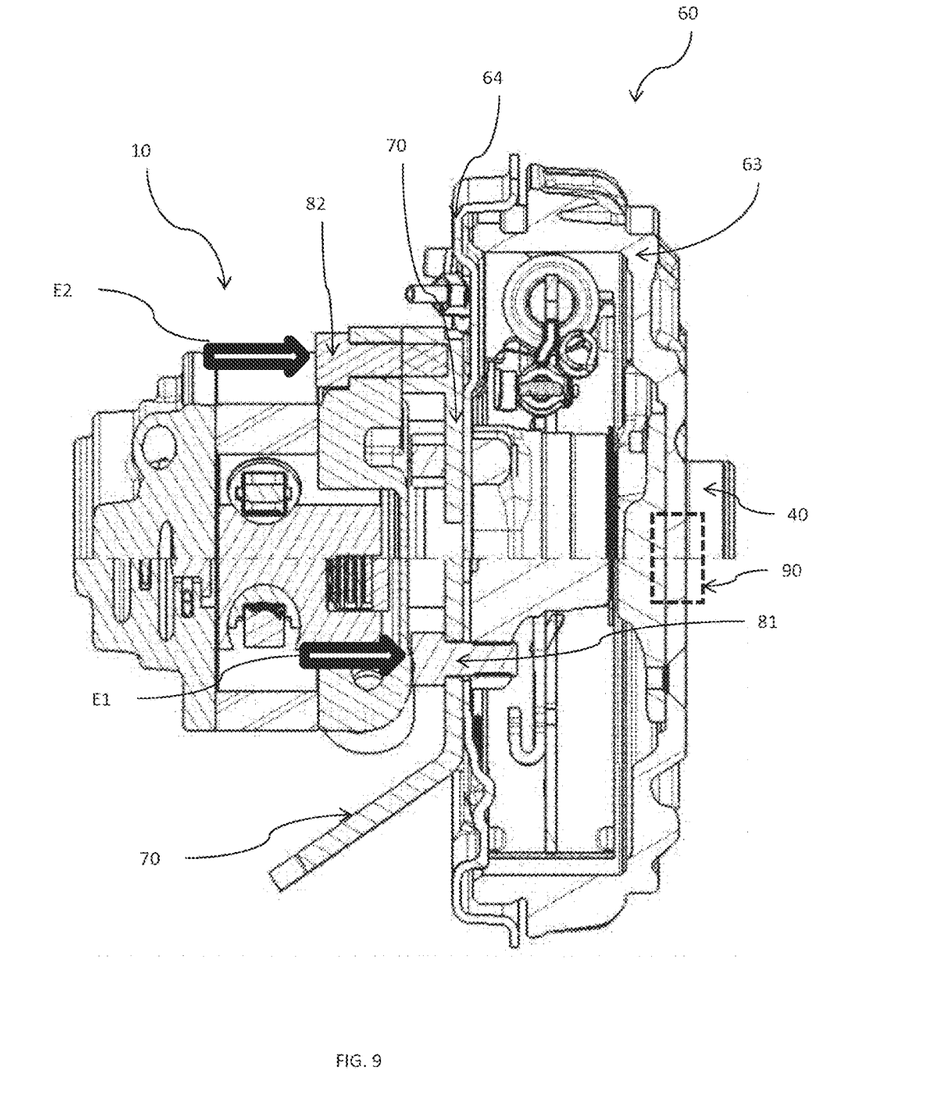
FIG. 9 shows, according to one embodiment, assembly steps of the assembly in a view with two sections stacked along the horizontal dotted line, the two sections corresponding to the biaxial section AA of FIG. 7.
Figure 10:
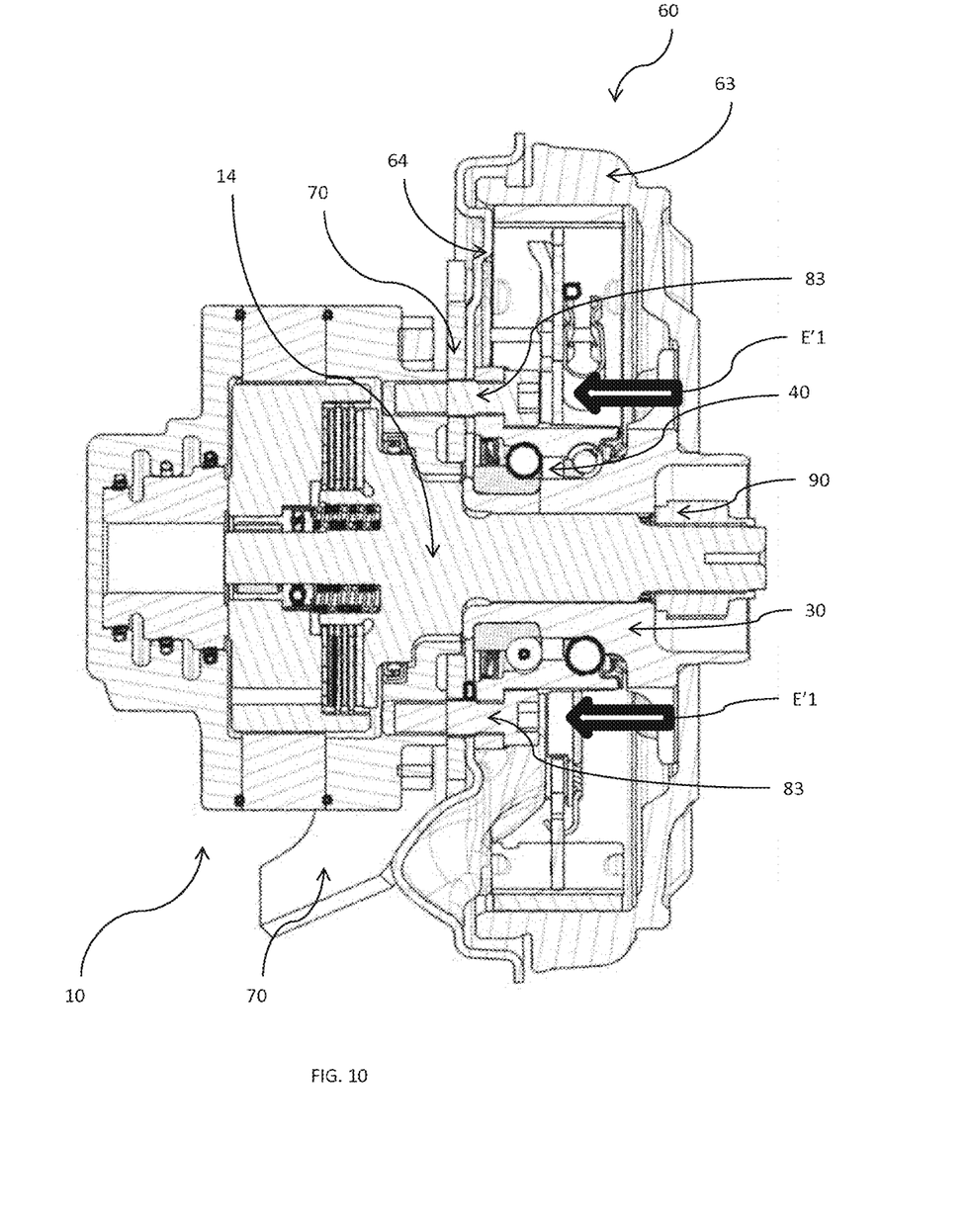
FIG. 10 shows assembly steps according to another embodiment.

Two assembly embodiments will be described at present, with reference to FIGS. 9 and 10.

The suspension element 70 is located longitudinally (that is along the axis of the shaft 14) between the motor 10 and the wheel hub 40. In the case of a drum brake 60, it is situated between the motor 10 and the drum brake (more precisely the drum 63, which is not driven in rotation).

An internal face of the suspension element 70 is defined, which is on the side of the motor, that is on the internal side of the vehicle, and an external face of the suspension element 70, which is on the side of the hub (or of the bearings), that is on the external side of the vehicle.

The first embodiment is accomplished from the internal side of the vehicle, that is from the side opposite to that of the wheel.

In a first step E1, symbolized by arrows on the figures), the fixed portion 62, 64 is fixed by bolting to the suspension element 70 (on the external face) by means of at least one screw 81.

The at least one screw 81 is inserted first into the suspension element 70, then subsequently into the fixed portion 62, 64 of the brakes 60 (that is toward the exterior of the vehicle).

Figure 7:
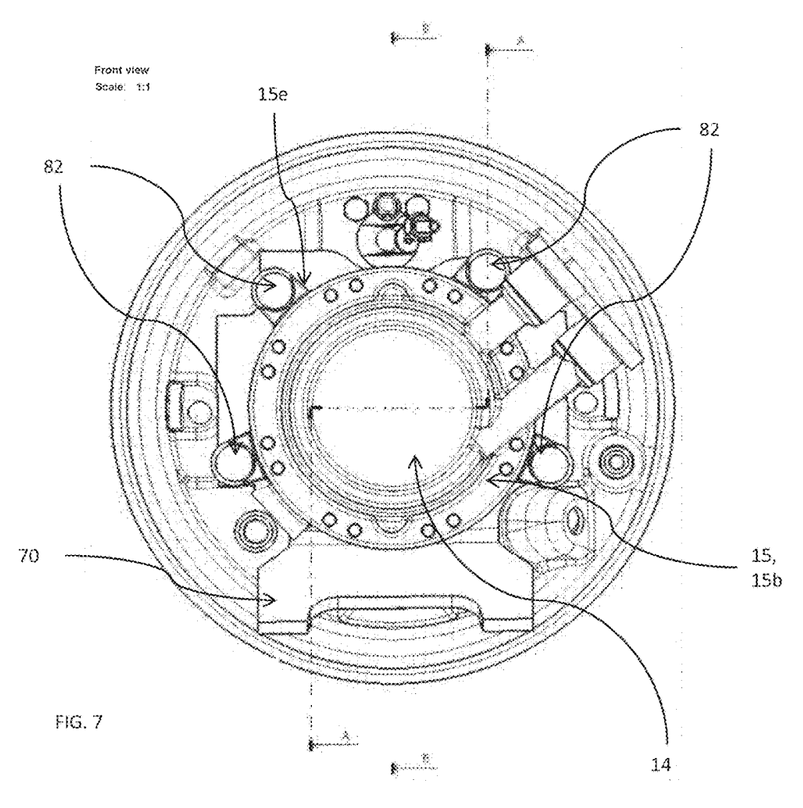
FIG. 7 shows an assembly conforming to an embodiment of the invention in front view, that is in the direction of the motor shaft.
Figure 8:
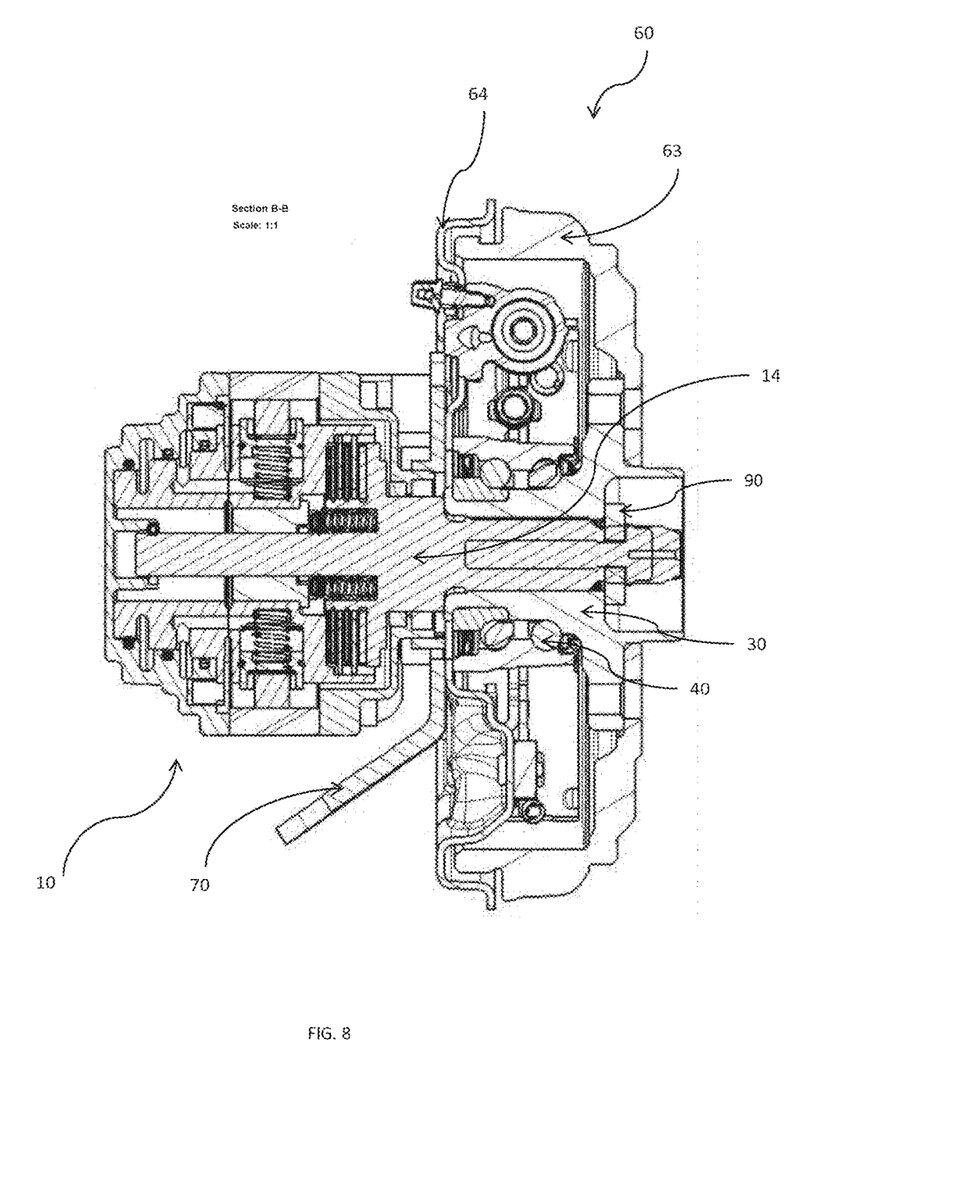
FIG. 8 shows a view along section BB of FIG. 7.

Typically, four screws 81 are provided for, for high-performance and correctly distributed tightening (not visible in FIG. 7, due to the motor 10).

In a second step E2, the motor 10 is fixed by bolting to the suspension element 70 (on the internal face) by means of at least [one] screw 82. The at least one screw 82 is inserted first into the housing 15, then subsequently into the suspension element 70 (that is toward the exterior of the vehicle).

The screw 81 is then covered by the motor 10 and is no longer accessible.

In this embodiment, the fixed portion 62, 64 of the brakes 60 is screwed from one side of the suspension element 70 while the motor 10 is screwed from the other side of said element 70. It is recalled that FIG. 9 shows two planes in different sections, so that the screws 81 and 82 visible in this figure are substantially diametrically opposed along the axis of the shaft 14.

Typically, four screws 82 are provided for (see FIG. 7), for a high performance and correctly distributed tightening.

In steps E1 and E2, the screws 81 and 82 are tightened.

In a step E3, the movable portion 61, 63 of the brakes 60 and the hub 30 are assembled.

Either the movable portion 61, 63 is installed and the hub is positioned, or the movable portion 61, 63 and the hub are previously assembled.

In a step E4, a wheel hub nut 90 is placed and tightened (visible in FIG. 9), to immobilize the hub 30 in translation. The nut 90 is positioned at the end 14a of the shaft 14.

The nut 90 contributes to the tightening of the rolling elements of the bearings 40.

In this embodiment, the screws are accessible from the internal side of the vehicle, in other words the assembly must be carried out from the internal side of the axle.

The second embodiment is carried out from the external side of the vehicle, that is on the side of the wheel.

In a first preliminary step (E'0), the fixed portion 62, 64 is positioned on the internal face of the suspension element 70. At least one preliminary holding screw can be provided (not shown). The preliminary holding screw has as its only function to preserve the positioning, and does not allow an assembly of the motor that resists forces during use.

In a second preliminary step (E'00), the motor 10 is placed on the internal face of the suspension element 70.

In a first step E'1 (symbolized by arrows in the figures), the fixed portion 62, 64, the suspension element 70 and the motor 10 are firmly attached to one another by bolting by means of a screw 83.

The screw 83 is inserted first into the fixed portion 62, 64 of the brakes 60, then subsequently into the suspension element 70 (that is toward the interior of the vehicle) and finally into the housing 15 of the motor 10.

In this same step E'1, another screw 83 is inserted diametrically opposite to the screw 83, for the purpose of balanced tightening.

Typically, four screws 83 are provided for (see FIG. 10, wherein two screws 83 are seen in a section along the axis of revolution of the motor 10) for high-performance and correctly distributed tightening.

In the step E'1, the screws 83 are tightened.

In this embodiment, the suspension element 70 is caught in a sandwich between the motor 10 and the fixed portion 62, 64 of the brakes 60.

Steps E'2 and E'3 are similar to steps E3 and E4 of the previous embodiment, for immobilizing the hub 30 in translation.

The nut 80 contributes to the tightening of the rolling elements of the bearings 40.

The hub 30 and/or the movable portion 61, 63 can comprise gaps for passing the screws 83 and the necessary assembly tools.

Alternatively, the hub 30 and/or the movable portion 61, 63 can be installed on the shaft 14 (but not tightened) prior to step E1.

In this case, the screws 83, 84 are passed through the gaps in the movable portion 61, 63 and/or the hub 30, and thereafter the spindle nut 90 is installed, then tightened.

In this embodiment, the screws 83 are accessible from the external side of the vehicle, that is the assembly must be carried out from the external side of the axle. This embodiment is more convenient for assembly lines.

The assembly of the motor 10 according to this method is clean, simple and rapid. The hydraulic motor is advantageously placed in a closed form and assembled to a wheel spindle of the vehicle. It can therefore be considered as a cartridge type assembly.

The invention claimed is:

1. An assembly comprising:
a hydraulic motor with radial pistons, comprising a fixed housing, a shaft, which can be driven in rotation directly by the hydraulic motor, a wheel hub comprising a hub barrel which grips the shaft (14), the hub being configured to be attached to a wheel, a bearing, a bearing support, wherein the bearing is housed between the hub barrel and the bearing support of the hydraulic motor, the bearing support is a part of the housing, at a longitudinal position of the bearing the following elements are arranged from the radially innermost to the radially outermost; the shaft the hub barrel, the bearing, the housing.

2. The assembly according to claim 1, wherein the hydraulic motor comprises a cylinder block which drives the shaft in rotation and wherein said cylinder block and shaft can be disengaged, the bearing function being retained by the housing in the disengaged and engaged position.

3. The assembly according to claim 2, comprising a multi-disk coupler between the cylinder block and the shaft, the coupler allowing engagement and disengagement.

4. The assembly according to claim 1, wherein the bearing is situated longitudinally between the hub and the hydraulic motor.

5. The assembly according to claim 1, wherein the shaft is a through shaft on the side of the hydraulic motor.

6. The assembly according to claim 5, wherein a cardan shaft is connected to the through portion of the shaft, said cardan transmitting a torque to the shaft.

7. The assembly according to claim 6, wherein said cardan is connected to a mechanical transmission chain, the hydraulic motor applying a torque in the same direction or in the opposite direction to that exerted by said mechanical transmission.

8. The assembly according to claim 1, wherein the motor comprises a speed measurement function comprising a target linked to a rotating portion and a sensor linked to a fixed portion of the motor, giving an indication of the rotation speed of the wheel even if the motor (10) is disengaged.

9. The assembly according to the claim 8, wherein the target is housed in the emerging end of the shaft on the side of the hydraulic motor, the sensor being attached to a fixed portion.

10. The assembly according to claim 1, also comprising brakes.

11. The assembly according to claim 10, wherein the brake is a disk brake firmly mounted to the hub and a caliper firmly mounted to the housing, and/or to a distribution cover and adapted to clamp the disk.

12. The assembly according to claim 10, wherein the brake is a drum brake, with a drum firmly attached to the hub, and at least one shoe firmly attached to the housing.

13. A system comprising an assembly according to claim 1 and a suspension element, characterized in that the housing and/or a distribution cover is firmly attached to the suspension element.

14. The system according to claim 13, wherein supply lines are carried by the housing or the distribution cover firmly attached to the suspension element.

15. An assembly method of a system according to claim 13, comprising firmly attaching the motor and the brakes with the suspension element by means of screws.

16. The assembly method according to claim 15, wherein the firm attachment step comprises the following steps:
(E1) installation and firm attachment of a fixed portion of the brakes to the suspension element by means of screws, the screws being inserted first into the suspension element, then subsequently into the fixed portion,
(E2) installation and firm attachment of the motor to the suspension element by means of screws, each screw being inserted first into the housing of the motor, then subsequently into the suspension element,
in such a manner that the assembly is designed to be carried out from the interior of the vehicle, on the axle side.

17. The assembly method according to claim 15, wherein the system comprises brakes wherein the firm attachment step comprises the following steps:
(E'0, E'00) installation of the motor and of a fixed portion of the brakes on either side of the suspension element (70),
(E'1) firm attachment of the motor, of the suspension element (70) and of the fixed portion of the brakes, by means of screws, each screw being inserted first into the fixed portion then into the suspension element and finally into the housing,
in such a manner that the assembly can be carried out from the outside of the vehicle, on the wheel side.

18. The assembly method according to claim 15, comprising a step consisting of
(E3, E'2) installation of the hub and of a movable portion (61, 63) of the brakes, configured to be firmly attached to the hub (30),
(E4, E'3) installation of a spindle nut at the end of the shaft to hold the hub.

19. A vehicle comprising a system according to claim 13.

20. A vehicle comprising an assembly according to claim 1.

* * * * *